Nov. 26, 1940.  T. MAXWELL  2,223,041
BORING HEAD
Filed Dec. 29, 1937   2 Sheets-Sheet 1

INVENTOR
THOMAS MAXWELL
BY Wm. M. Cady
ATTORNEY

Nov. 26, 1940.  T. MAXWELL  2,223,041
BORING HEAD
Filed Dec. 29, 1937  2 Sheets-Sheet 2
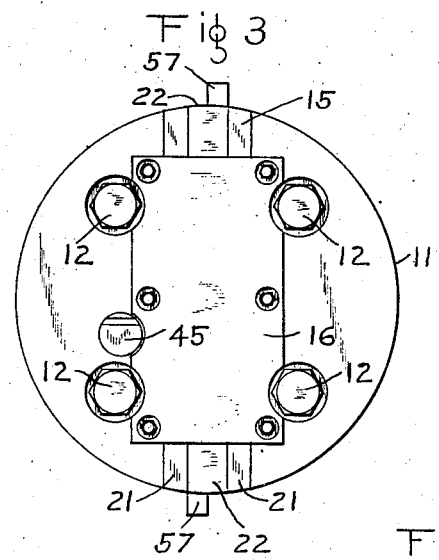
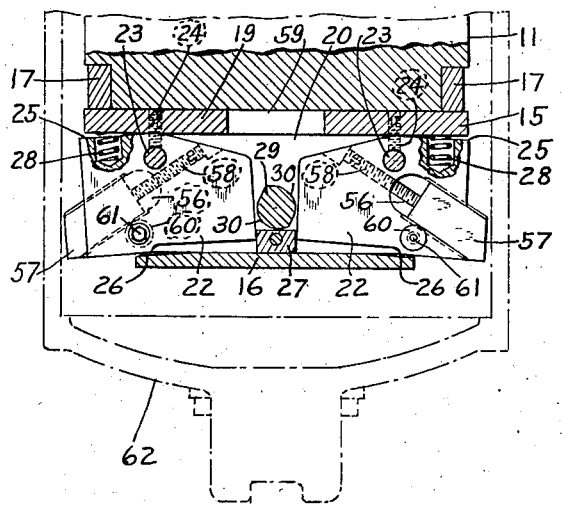
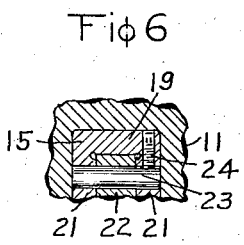
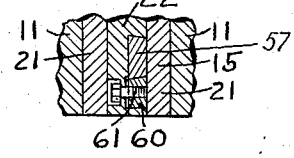
INVENTOR
THOMAS MAXWELL
BY
ATTORNEY Patented Nov. 26, 1940

2,223,041

UNITED STATES PATENT OFFICE 2,223,041

BORING HEAD

Thomas Maxwell, Pittsburgh, Pa., assignor to The Westinghouse Air Brake Company, Wilmerding, Pa., a corporation of Pennsylvania Application December 29, 1937, Serial No. 182,294

8 Claims. (Cl. 77—58)

This invention relates to boring machines or the like and more particularly to the head portion thereof which carries the cutting tool or tools.

In boring cylinders, particularly of the type having a closed end or the like which prevents a boring tool passing completely through the cylinder, it is necessary at the end of a cut to draw the tool back through the cylinder. If the tool drags against the cylinder wall as it is thus withdrawn, it is evident that the cylinder wall will be scored. This is very undesirable and the principal object of the invention is to provide an improved boring head having means for moving the cutting tool or tools out of their working position and thus out of engagement with the wall of a cylinder at the end of a cut, so as to thereby avoid scoring the wall of the cylinder as the boring head and thereby the cutting tool or tools are withdrawn from the cylinder.

Other objects and advantages will be apparent from the following more detailed description of the invention.

Figure 1:
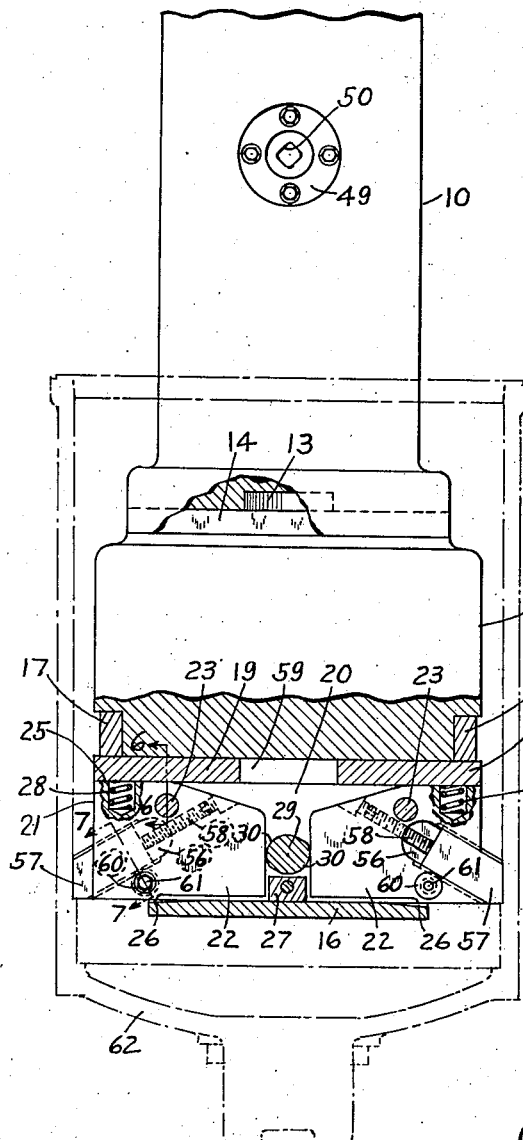
Figure 2:
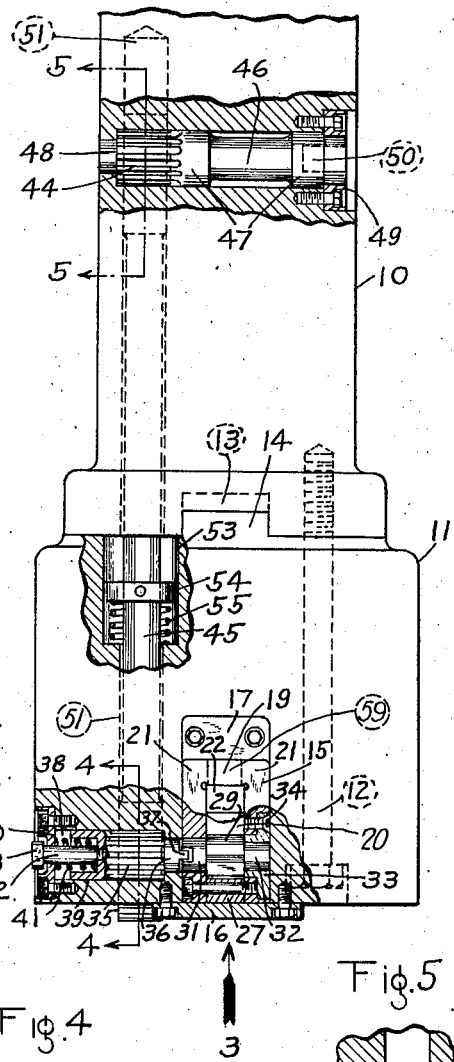
Figure 4:
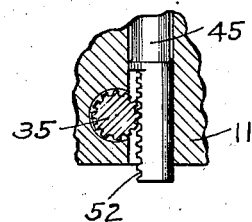
Figure 5:
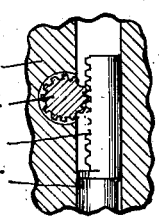

In the accompanying drawings; Fig. 1 is a side view of a boring head and a portion of a spindle or bar carrying same, with certain parts broken away to show internal construction embodying the invention; Fig. 2 is also a side view similar but at right angles to the view shown in Fig. 1 and having certain parts broken away to show internal construction; Fig. 3 is an end view of the boring head shown in Figs. 1 and 2 looking in the direction of arrow 3 in Fig. 2; Figs. 4, 5, 6, and 7 are sectional views taken on the lines 4—4 and 5—5 in Fig. 2, and 6—6 and 7—7 in Fig. 1, respectively; and Fig. 8 is a view similar to a portion of Fig. 1, but showing certain parts in a different position.

The reference character 10 designates a boring bar or spindle of a boring mill or the like. A boring head 11 is secured to the end of spindle 10 by a plurality of bolts 12 extending through said head and having screw-threaded engagement in the spindle 10. The heads of the bolts 12 are countersunk in the end of head 11, as shown in the drawings.

The end of spindle 10 to which the head 11 is secured is provided with an axial bore and with a slot extending diametrically across the spindle, while the adjacent end of head 11 is provided with a cylindrical boss 13 and a tongue 14 which fit into said bore and slot respectively, for the purpose of centralizing said head with respect to the spindle 10 and for providing a driving connection between said spindle and head.

The head 11 is provided with a slot extending diametrically across the outer end thereof, and disposed in this slot is a channel shaped element 15 comprising a back portion 19 and two spaced side portions 21. The two side portions 21 slidably contact the two side walls of the slot in head 11. A wear element 17 is secured in a recess in head 11 at each end of the slot in said head for sliding contact with the back portion 19 of element 15, while the ends of the side portions 21 of said element slidably engage a wear plate 16 secured centrally to the end of said head. The element 15 is thereby rigidly supported in the head 11 in all directions except longitudinally of the element, movement longitudinally being permitted so that said element may be slipped into or out of the slot in said head as desired.

The portions 19 and 21 of the element 15 define three sides of a channel 20 extending from end to end of said element. The wear plate is shorter than the diameter of head 11, so that beyond the ends of said plate, the channel 20 is open to the end of the head 11.

A tool holder 22 is disposed in the slot 20 at each end of the element 15 and these holders have a neat sliding fit with the side walls of said slot. The two tool holders 22 are oppositely disposed and each is mounted to turn on a pin 23 mounted in the side portions 21 of the element 15 and held in place by a set screw 24 secured in said element by screw-threaded engagement.

Each tool holder 22 is provided with a face 25 adapted to engage the end wall of slot 20 to define the working position of the holder, in which the parts are shown in Fig. 1. The holder is relieved at the inner side of the fulcrum pin 23 to permit the holder to turn on said pin from the working position just described to a retracted position in which the portion of the holder below said pin is drawn into the head to a slight degree, as shown in Fig. 8 of the drawings. Each end of the plate 16 is provided with a tapered recess 26 into which the lower or adjacent edge of the respective tool holder can freely move as the tool holder is moved to the retracted position.

A spacer 27 is secured between the two side portions 21 of element 15 midway between the ends and adjacent the outer edges of said side portions for preventing warping of element 15 and thereby binding of tool holders 22 in said element. In Fig. 8 of the drawings the holders 22 are shown in engagement with the spacer 27 in order to more clearly show the retracted position of said holders, but in use said holders in the retracted position may never engage said spacer.

In other words, the spacer is not provided to act as a stop for the holders 22.

A compression spring 28 is provided at each end of the element 15 to act on the respective tool holder 22 outside the fulcrum pin 23 for urging said holder to the retracted position. Each of these springs is preferably disposed in a bore in each holder, the bore opening at the face 25 of the holder so that one end of the respective spring bears against the bottom of said bore while the other end bears against the end wall of slot 20.

A cam 29 is disposed between the adjacent ends of the two tool holders 22 and is provided with opposite and similar cam surfaces 30 adapted upon rotation of the cam in one direction to turn the tool holders to their working position, and operative upon rotation in the opposite direction to permit the springs 28 to turn the tool holders to their retracted positions, the angularity of the cam surfaces 30 being such as to self-lock the holders 22 in their working position.

The cam 29 is provided on its opposite ends with coaxial journals 31 and 32, the journal 31 bearing in a suitable bore provided through one side 21 of the element 15, while the journal 32 bears in a suitable bore provided in a removable bearing plate 33 secured to the opposite side 21 of element 15 in any suitable manner, as by one or more screws 34.

A pinion gear 35 is provided for turning the cam 29 to its different positions. The gear 35 is disposed in a radial bore 38 provided in head 11 in axial alignment with the cam journal 31 and said gear has at its inner end a journal 36 of smaller diameter than said bore and extending through a bearing of suitable diameter to the slot in which the element 15 is mounted. A tongue 37 is provided on the end of journal 36 and is normally disposed in a groove provided in the end of the cam journal 31 thereby providing a driving connection between the gear 35 and cam 29.

The gear 35 is provided at its outer end with a hollow sleeve like journal 39 bearing in the radial bore 38. A cap 40 suitably recessed in head 11 is secured over the outer end of the bore 38 and interposed between said cap and the end of the gear journal 39 is a spring 41 under compression and therefore urging the gear 35 to its normal position as defined by engagement of the inner end face of said gear with the shoulder formed at the junction of bore 38 with that in which the pinion journal 36 is disposed.

The cap 40 is provided centrally with an aperture and extending through this aperture is a pin 42 the inner end of which is secured to the gear journal 39 by screw-threaded engagement, while on the outer end there is provided a head 43 normally disposed in a recess provided in the outer face of cap 40. The periphery of this recess is spaced from that of the head 43, and said head is spaced from the bottom of said recess, this spacing being such as to permit the insertion of a tool, such as the end of a screw-driver (not shown), under said head, whereby upon turning of the tool over the edge of the recess the gear 35 and thereby the tongue 37 on the end of the inner journal 36 may be withdrawn from the slot in the end of the cam journal 31 and entirely out of the slot in which the element 15 is disposed, for reasons which will be hereinafter described. When the tool is withdrawn from beneath the head 43 of pin 42, spring 41 is adapted to urge the gear 35 and tongue 37 back to the position shown in Fig. 2, as will be evident.

In a portion of the spindle 10 beyond that which will enter a cylinder during boring thereof, there is disposed a gear 44 for operating the gear 35 through the medium of a rack bar 45. The gear 44 is preferably formed on a shaft 46 which is disposed in a suitable bore in the spindle. The shaft 46 has at one side of the gear two spaced bearings 47 in the spindle and at the opposite side a bearing 48 of smaller diameter than bearings 47. A ring 49 is secured in a recess in spindle 10 over the end of the outer bearing 47, the opening through said ring being smaller than the diameter of said bearing so as to thereby hold the shaft 46 and gear 44 properly positioned in the spindle 10. In the outer end of the shaft bearing 47 there is provided a recess 50, preferably square in shape, for the reception of the end of a socket wrench or the like (not shown) whereby the gear 44 may be turned.

At one side of the parallel bores in which the gears 35 and 44 are mounted there is provided a bore 51 extending through both the spindle 10 and head 11 from a point beyond the gear 44 through the wear plate 16 secured to the end of the head. The rack 45 is slidably mounted in this bore which is so spaced from the gears 35 and 44 that gear teeth 52 provided on portions of the rack near the ends thereof are in driving engagement with the teeth of said gears whereby rotation of the gear 44 is adapted to be transmitted through said rack to the gear 35 for effecting rotation thereof.

A recess 53 is provided in the head 11 concentric with bore 51 and disposed in this recess and secured to the rack bar 45 is a collar 54. A spring 55, disposed in the recess 53 and surrounding the rack bar 45, has one end engaging collar 54 and the other end engaging the bottom of said recess. This spring is provided merely to support the weight of the rack bar 45 when the tool holders 22 are in their working position as shown in Fig. 1 of the drawings, for a reason which will be hereinafter described.

Each of the tool holders 22 is provided in the side which leads in a boring operation as shown in Fig. 3 with a groove 56 preferably extending diagonally toward the leading end of the outer edge of said holder and slidably mounted in said groove is a cutting or boring tool 57. The sides of the groove 56 and tool 57 are tapered so as to provide a dovetail connection between them.

An adjusting screw 58 is provided in each holder to engage the inner end of the respective tool 57 for moving said tool outwardly in its slot for the purpose of adjusting the tool to the bore to be machined. The back portion 19 of the element 15 is provided centrally with a slot 59 through which a screw-driver may be inserted into driving engagement with the end of the screw 58 in both holders for effecting the adjustment of said screws as will be hereinafter described.

Each of the holders 22 has at one side of groove 56 a bore, a portion of one side of which is open to said groove, and slidably mounted in this bore is a wedge in the form of a cylindrical element 60 a portion of one side of which is cut away at an angle to engage the adjacent tapered edge of the tool 57. The length of the element 60 substantially equals the depth of groove 56, but is less than the depth of the bore in which it is disposed. A cap screw 61 extends through a suitable bore in each of the holders 22 from the side opposite the tool 57 and has screw-threaded engagement with the wedge element 60 whereby upon turning said screw said element is adapted to be drawn into wedging engagement with one side of tool 57 for locking said tool in groove 56. The cap screw 61 in each holder is provided with a head for turning same, and the respective tool holder 22 is provided with a recess which receives said head, as clearly shown in Fig. 7 of the drawings.

From the above description, it will be noted that the holders 22 and thereby the tools 57 are carried by the element 15 and these parts as a unit may be slipped into or removed from the slot in the head 11, as desired. Before this unit assembly is applied to head 11, however, the tools 57 are adjusted to provide a cut of the desired diameter through the cylinder to be worked upon.

In order to thus adjust the tools 57, the cam 29 is operated, by any suitable means which may be applied to the slot in the end of the cam journal 31, to turn the holders 22 outwardly to their working positions defined by engagement of surfaces 25 in the holders with the portion 19 of element 15, as hereinbefore described. Then by means of a screw driver inserted through opening 59 in element 15, the screws 58 are turned to force the tools 57 outwardly until the distance between the cutting edges of the tools, as determined by a micrometer or the like, equals the diameter of the bore which it is desired to provide in the cylinder to be operated upon.

After the tools 57 are thus adjusted, the element 15 and parts carried thereby are slipped into the head 11 to their working position. In order to thus apply the element 15 to head 11, the bolt 42 is operated by a screw-driver or the like inserted beneath its head 43 to draw the gear 35 and journal 36 outwardly of the head 11 and thereby pull the tongue 37 on the end of said journal out of the slot in which element 15 is adapted to be disposed. The element 15 is then slipped into position and the bolt 42 released whereupon spring 41 returns the gear 35, journal 36 and tongue 37 on the end of said journal towards the right hand as viewed in Fig. 2 of the drawings.

Spring 55 acts with just sufficient force to support the weight of the rack bar 45 in the position of said bar shown in the drawings so that upon the release of spring 41, the tongue 37 will be lined up to freely enter the slot in the end of the cam journal 31 if the cam is in the position holding the holders 22 in their working positions. If the cam 29 does not happen to be in this position, then the tongue 37 will have to be turned to obtain driving engagement with said cam.

After the element 15 is thus applied to head 11, the shaft 46 and thereby gear 44 should be turned by means of any suitable tool inserted in socket 50 in the end of said shaft, in such a direction as to move the rack bar 45 toward the gear 35, so as to thereby turn said gear and the cam 29 in a clockwise direction, as viewed in Fig. 1 of the drawings, in order to insure that the tool holders 22 and thereby the tools 57 are firmly blocked in their working position above described.

In this working position it will be noted that there is clearance space between the tongue 37 and the slot in which it is disposed, and that said tongue and slot both extend substantially longitudinally of the element 15, the purpose being to prevent said tongue binding against the side wall of said slot and thereby possibly interfering with the floating movement of the element 15 and parts carried thereby cross-wise of the head 11. In order to insure that the tongue 37 will be in this position, the spring 55 is provided to just counterbalance or support the weight of the rack bar 45 when the holders 22 and tools 57 are in their working position, thus preventing the weight of said bar acting on the gear 35 to turn tongue 37.

It is of course evident that in practice the clearance space between tongue 37 and the side walls of the groove in which said tongue is disposed might not be uniform, but this is immaterial. In fact, it might be found that spring 55 could be dispensed with, without materially affecting the floating of element 15 in head 11. The spring 55 would of course not be necessary in machines of the type where the rack bar 45 would be mounted to slide horizontally, or substantially so.

The improved boring head 11 above described is particularly adapted, though not limited, for use in boring cylinders of the type where the boring tool can not pass completely through the cylinder, such as cylinders having a closed end. Such a cylinder is shown in Figs. 1 and 8 of the drawings in dot and dash lines and is indicated by the reference character 62.

In order to bore the cylinder 62 on a boring machine provided with the spindle 10, head 11 and parts carried thereby, the cylinder is set up in the machine so that the bore to be machined is lined up as close as possible concentric with the boring head 11. Either the boring head 11 and/or cylinder 62 is then operated in the usual manner so that the tools 57 take a cut through the cylinder to the desired depth adjacent the closed end of the cylinder. This boring head is used only to effect the finishing, and therefore relatively light cut through cylinders, the roughing cut being effected by other machines, and in case, after the cylinder is set up in the machine, the rough cut bore is slightly concentric to boring head 11, such as for instance .003 of an inch, then while taking the cut just described, the element 15 will shift slightly cross-wise of the head 11 as said head is turned so as to adjust the tools 57 to the bore and thereby provide a substantially true, smooth bore.

At the end of the cut above described, it will be noted that the socket 50 is still outside of the cylinder 62 and therefore accessible. A tool is then inserted in socket 50 and operated to turn the gear 44 in such a direction as to pull the rack bar 45 in the direction of spindle 10, and the gear 35 is thereby operated to turn the cam 29 in a counterclockwise direction, as viewed in Fig. 1 of the drawings.

This operation of cam 29 relieves pressure on the tool holders 22, and due to the shortening of the radius of the portions of cam surfaces 30 engaging said holders, permits springs 28 to rotate holders 22 on their respective pins 23 in opposite directions such that the tools 57 are moved toward the head 11 and thus out of contact with the wall of the bore being machined, as shown in Fig. 8 of the drawings. This movement need only be sufficient to provide a clearance such as for instance two thousandths of an inch between the cylinder wall and tools. The clearance shown between the cylinder wall and tools in Fig. 8 of the drawings is exaggerated for the purpose of illustration.

After the tools 57 are thus moved out of contact with the cylinder wall, the boring head 11 is moved out of the brake cylinder 62 and it will be noted that since the tools 57 are not engaging the walls of the cylinder at this time the wall will not be scored as the head is removed from the cylinder.

After the head 11 is moved out of the cylinder, the tool applied to socket 50 in the gear shaft 46 is operated to turn the gear 44 and thereby effect operation of the rack bar 45, gear 35 and cam 29 to turn the holders 22 and tools 57 back to their working position above described, for a subsequent boring operation.

When it is desired to sharpen, renew or the like the tools 57, it is necessary to remove the element 15 from the head 11, and in order to accomplish this the bolt 42 is lifted by a screw-driver against the force of spring 41 to a position in which the tongue 37 is completely withdrawn from the slot in head 11 in which the element 15 is disposed. The element 15 and the parts carried thereby may then be slipped out of said head from either side thereof, as will be evident.

It will be noted that the invention may be associated with any type of boring machine, that is, types in which either the head 11 or work piece, or both, are turned and/or moved longitudinally relative to the other, and regardless of the direction of such movement, i. e., horizontally or vertically.

It is further desired to point out the improved boring head may be employed to bore any conventional type of cylinder, and is therefore not limited to use to the particular type shown in the drawings for the purpose of illustration.

While one illustrative embodiment of the invention has been described in detail, it is not the intention to limit its scope to that embodiment or otherwise than by the terms of the appended claims.

Having now described my invention, what I claim as new and desire to secure by Letters Patent, is:

1. A machine for boring a cylinder having in combination, a boring head having a transverse slot, an element mounted to slide in said slot during boring operation of said head, oppositely disposed simultaneously operative cutting tools carried by said element at the opposite ends thereof, said tools having a working position and being movable out of said working position, and means in said head operatively connected to said tools in all working positions thereof for controlling the position of said tools.

2. A machine for boring a cylinder having in combination, a boring head having a transverse slot, an element mounted to slide in said slot during boring operation of said head, oppositely disposed simultaneously operative cutting tools carried by said element at the opposite ends thereof, said tools having a working position and being movable out of said working position, actuating means in said element for positioning said tools, and manually controlled means in said head operatively connected to said actuating means in all working positions of said element and tools for controlling the operation of said actuating means.

3. A machine for boring a cylinder having in combination, a boring head having a transverse slot, an element mounted to slide in said slot during boring operation of said head, oppositely disposed simultaneously operative cutting tools carried by said element at the opposite ends thereof, said tools having a working position, actuating means in said element for positioning said tools, and manually controlled means in said head having a lost motion connection with said actuating means in all positions of said element in said head for controlling the operation of said actuating means and operative in the working position of said tools to permit movement of said element and tools transversely of said head.

4. A machine for boring a cylinder having in combination, a boring head having a transverse slot, an element mounted to slide in said slot during boring operation of said head, oppositely disposed simultaneously operative cutting tools carried by said element at the opposite ends thereof, said tools having a working position and being movable out of said working position, actuating means including a shaft journaled in said element for controlling the positioning of said tools, a shaft journaled in said head for operating the shaft in said element, said shafts having a tongue and slot connection so arranged as to extend parallel to the said slot in said head in the working position of said tools whereby in said working position, said element and tools are free to slide transversely of said head relative to the said shaft in said head.

5. A machine for boring a cylinder having in combination, a boring head having a transverse slot, an element mounted to slide in said slot during boring operation of said head, oppositely disposed simultaneously operative cutting tools carried by said element at the opposite ends thereof, said tools having a working position and being movable out of said working position, actuating means including a shaft journaled in said element for controlling the positioning of said tools, a shaft journaled in said head for operating the shaft in said element, said shafts having a tongue and slot connection so arranged as to extend parallel to the said slot in said head in the working position of said tools whereby in said working position, said element and tools are free to slide transversely of said head relative to the said shaft in said head, a vertically movable member in said head for operating the shaft in said head, and means for counterbalancing the weight of said member when said tongue and slot extend parallel to the said slot in said head.

6. A machine for boring a cylinder having in combination, a boring head having a transverse slot, an element mounted to slide in said slot during boring operation of said head, oppositely disposed, simultaneously operative cutting tools carried by said head at the opposite ends thereof, said tools having a working position and being movable out of said position, actuating means in said element for positioning said tools, means in said head movable into said element for connection with said actuating means in all positions of said element in said head for controlling the operation of said actuating means to position said tools, said means being movable out of said element into said head, and said element and tools being movable as a unit into and out of the said slot in said head when said means is moved out of said element.

7. A machine for boring a cylinder having in combination, a boring head having a transverse slot, an element mounted to slide in said slot during boring operation of said head, a tool holder pivotally mounted at each of the opposite ends of said element, a cutting tool in each of said holders, actuating means including a shaft journaled in said element operative upon rotation in one direction to simultaneously rock said holders to move said tools to their working position, means operative upon rotation of said shaft in the opposite direction to rock said holders to move said tools out of their working position, control means carried in said head having a projected position for connection with said shaft to control the rotation thereof and having a retracted position disconnected from said shaft to permit said element and thereby said tool holders and tools to be slid into and out of said slot, and means for controlling the positioning of said control means.

8. A machine for boring a cylinder having in combination, a boring head having a transverse slot, an element mounted to slide in said slot during boring operation of said head, a cutting tool carried at each end of said element, the tools at both ends of said element being simultaneously operative, a holder pivotally mounted in said element at each end thereof carrying the respective tool, said holders and thereby said tools being movable to a working position and to a retracted or non-working position, means in said element for simultaneously moving said holders and tools to their different positions, and adjusting means in each of said holders for adjusting said tools with respect to said holders.

THOMAS MAXWELL.